United States Patent
Pursifull (10) Patent No.: US 9,127,976 B2
(45) Date of Patent: Sep. 8, 2015

(54) METHOD FOR DETERMINING CRANKCASE BREACH AND OIL LEVEL

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 582 days.

(21) Appl. No.: 13/451,314

(22) Filed: Apr. 19, 2012

(65) Prior Publication Data

US 2013/0282255 A1   Oct. 24, 2013

(51) Int. Cl.
| | | |
|---|---|---|
| F02D 28/00 | (2006.01) | |
| G01F 23/00 | (2006.01) | |
| F02B 77/08 | (2006.01) | |
| F01M 1/18 | (2006.01) | |
| F01M 11/00 | (2006.01) | |
| F01M 11/12 | (2006.01) | |
| G01M 15/06 | (2006.01) | |

(52) U.S. Cl.
CPC ............ *G01F 23/0076* (2013.01); *F01M 1/18* (2013.01); *F01M 11/0004* (2013.01); *F01M 11/12* (2013.01); *F02B 77/08* (2013.01); *G01M 15/06* (2013.01)

(58) Field of Classification Search
CPC ................. F01M 13/00; F01M 13/02–13/028; F01M 2013/00; F01M 2013/0077; F01M 2013/0083; F01M 11/10; F01M 11/12; G01M 15/09; G01F 23/14; G01F 23/0069; G01F 23/0076

USPC ....... 123/41.86, 196 CP, 196 S, 196 D, 196 P, 123/572, 574; 701/101, 102, 114; 340/450.3; 73/40, 49.2, 114.56, 114.57

See application file for complete search history.

(56) References Cited

U.S. PATENT DOCUMENTS

| | | | |
|---|---|---|---|
| 1,508,969 A | | 9/1924 | Guichard |
| 3,990,307 A | | 11/1976 | Guidicelli |
| 4,497,205 A | | 2/1985 | Zulauf et al. |
| 4,522,170 A | * | 6/1985 | Lenk et al. ............. 123/198 DC |
| 4,584,977 A | * | 4/1986 | Lenk et al. ................. 123/196 S |
| 4,734,682 A | * | 3/1988 | Bond, Jr. ........................ 340/614 |
| 4,754,732 A | | 7/1988 | Kuczenski et al. |
| 4,949,070 A | * | 8/1990 | Wetzel ........................ 340/450.3 |
| 5,379,638 A | * | 1/1995 | Denz et al. ....................... 73/291 |
| 5,661,228 A | | 8/1997 | Young |
| 5,744,701 A | * | 4/1998 | Peterson et al. ................ 73/49.2 |
| 5,792,949 A | * | 8/1998 | Hewelt et al. .............. 73/114.01 |
| 5,897,597 A | * | 4/1999 | O'Daniel ........................ 123/574 |
| 6,240,772 B1 | * | 6/2001 | Thomas ...................... 73/114.01 |
| 6,338,329 B2 | | 1/2002 | Maegawa et al. |
| 6,907,780 B1 | | 6/2005 | Meagher |

(Continued)

OTHER PUBLICATIONS

Pursifull, Ross Dyskstra et al., "Crankcase Integrity Breach Detection," U.S. Appl. No. 13/618,884, filed Sep. 14, 2012, 21 pages.

*Primary Examiner* — Mahmoud Gimie
*Assistant Examiner* — John Zaleskas
(74) *Attorney, Agent, or Firm* — Julia Voutyras; Alleman Hall McCoy Russell & Tuttle LLP (57) ABSTRACT

Embodiments for detecting crankcase breach are provided. In one example, a method includes indicating both crankcase ventilation system degradation and a crankcase oil sump level based on a common crankcase sensor. In this way, the same sensor can provide both crankcase breach detection and oil level determination.

12 Claims, 4 Drawing Sheets

(56) References Cited

U.S. PATENT DOCUMENTS

| | | |
|---|---|---|
| 6,915,772 B2 * | 7/2005 | Carpenter ............... 123/179.12 |
| 7,013,225 B2 * | 3/2006 | Guertler et al. ................ 702/55 |
| 7,251,997 B1 | 8/2007 | Casey |
| 7,461,546 B2 * | 12/2008 | Schmidt et al. ............ 73/114.56 |
| 7,739,904 B2 * | 6/2010 | Yokoi et al. ............... 73/114.56 |
| 2001/0047801 A1 * | 12/2001 | Baeuerle et al. .............. 123/574 |
| 2005/0022795 A1 * | 2/2005 | Beyer et al. ................... 123/516 |
| 2006/0170543 A1 | 8/2006 | Schaffer et al. |
| 2008/0016954 A1 | 1/2008 | Heinrich et al. |
| 2010/0042310 A1 * | 2/2010 | Shinogi et al. ................ 701/112 |
| 2010/0050754 A1 * | 3/2010 | Roal et al. .................. 73/114.37 |
| 2010/0147270 A1 * | 6/2010 | Pursifull et al. .............. 123/521 |

* cited by examiner

METHOD FOR DETERMINING CRANKCASE BREACH AND OIL LEVEL

FIELD

The present disclosure relates to crankcase breach detection.

BACKGROUND AND SUMMARY

Engines may include crankcase ventilation systems to vent gases out of the crankcase and into an engine intake manifold to provide evacuation of gases from inside the crankcase in order to reduce degradation of various engine components in the crankcase.

Under certain conditions, crankcase ventilation systems may be monitored to identify breaches in the system. For example, a fresh air hose (breather tube) may become disconnected, an oil cap may be off or loose, a dipstick may be out of position, and/or other seals in the crankcase ventilation system may be broken. Following a crankcase breach, degradation of various components included in the crankcase may occur, or the gases may not be properly ingested into the engine to be rendered innocuous.

Various approaches may be used to monitor crankcase ventilation system integrity. For example, a pressure sensor may be used in the crankcase and a valve in a crankcase vent tube may be opened so that pressure or vacuum changes may be sensed in the crankcase to determine if there is a breach in the system.

In other approaches, a plurality of absolute sensors, e.g., a barometric pressure sensor (BP), a compressor inlet pressure sensor (CIP), a throttle inlet pressure sensor (TIP), a manifold air pressure sensor (MAP), and/or a pressure sensor in a crankcase vent hose, etc., may be used in combination to monitor crankcase ventilation system integrity.

However, the inventors herein have recognized that such approaches may add additional hardware to such monitoring systems, e.g., additional sensors and valves, thus increasing costs and complexity of a crankcase ventilation monitoring system. Additionally, some of these sensors may be underutilized, e.g., the crankcase pressure sensor may only be used for crankcase breach detection, thus limiting the value of such sensors.

Thus, in one approach, to at least partially address these issues, an engine method is provided. The method comprises indicating both crankcase ventilation system degradation and a crankcase oil sump level based on a common crankcase sensor.

In this way, the same sensor information may be used for both crankcase breach detection and oil level determination. For example, a crankcase pressure sensor may be positioned in the crankcase oil sump such that it is immersed in oil during engine operation. Under certain conditions, such as when the crankcase is exposed to atmospheric pressure, the pressure sensor may output pressure correlated primarily (or sometimes only) to the oil in the oil sump, which may be converted to the oil level. Then, under other conditions, such as when the crankcase is sealed (e.g., one or more valves coupling the crankcase to atmosphere are closed) and pressure or vacuum is applied to the crankcase, the pressure sensor may output the sum of the oil sump pressure (pressure due the depth below the liquid surface) and the gas pressure of the crankcase. The gas pressure of the crankcase may then be used to determine if a crankcase breach is present and various actions taken in response thereto.

Thus, in one example, a common crankcase sensor may be used both for detecting crankcase breach and for sensing oil level. In doing so, engine hardware may be reduced, lowering cost and reducing system complexity. Further, by immersing the pressure sensor in engine oil, mechanical damping may be provided by the oil, reducing noise in the pressure signal and improving accuracy of the pressure detection.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
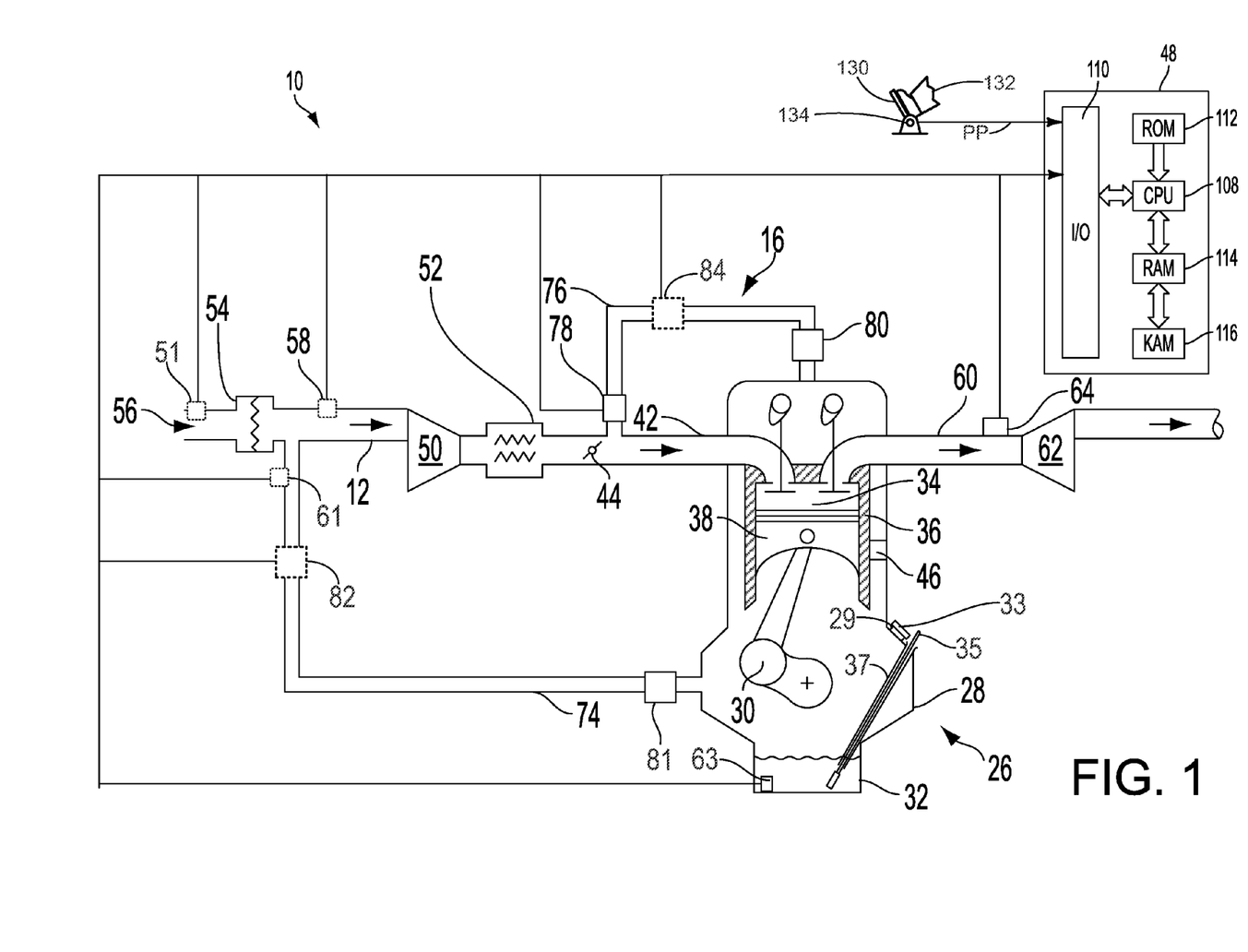
FIG. 1 shows a partial engine view according to an embodiment of the present disclosure.

In order to detect and respond to crankcase breach, where crankcase gas vapors may escape to the atmosphere via an uncapped lubricant filling port or unseated dipstick, for example, engine crankcases may include a sensor, such as a pressure sensor. Under certain operating conditions when the crankcase is isolated from the atmosphere and pressure or vacuum is applied to the crankcase, the sensor may be used to detect breach. In addition, if the crankcase sensor is immersed in the oil in the oil sump, when the crankcase pressure is equalized with atmospheric pressure or another reference pressure, the crankcase sensor may be also be used as an oil level sensor. Thus, a single sensor may be utilized to both detect breach and determine oil level. FIG. 1 is a diagram of engine including a crankcase sensor immersed in engine oil. The engine of FIG. 1 also includes a controller which may carry out one or more control routines, such as the methods of FIG. 2 and FIG. 4. Example pressure sensor outputs during the breach detection are depicted in FIG. 3.

Referring now to FIG. 1, it shows an example system configuration of a multi-cylinder engine, generally depicted at 10, which may be included in a propulsion system of an automobile. Engine 10 may be controlled at least partially by a control system including controller 48 and by input from a vehicle operator 132 via an input device 130. In this example, input device 130 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30. Crankcase 28 contains gas and includes an oil sump 32, otherwise referred to as an oil well, holding engine lubricant (e.g., oil) positioned below the crankshaft. An oil fill port 29 may be disposed in crankcase 28 so that oil may be supplied to oil sump 32. Oil fill port 29 may include an oil cap 33 to seal oil port 29 when the engine is in operation. A dip stick tube 37 may also be disposed in crankcase 28 and may include a dipstick 35 for measuring a level of oil in oil sump 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injectors (not shown) and intake air from intake manifold 42 which is positioned downstream of throttle 44. The engine block 26 may also include an engine coolant temperature (ECT) sensor 46 input into an engine controller 48 (described in more detail below herein).

A throttle 44 may be disposed in the engine intake to control the airflow entering intake manifold 42 and may be preceded upstream by compressor 50 followed by charge air cooler 52, for example. An air filter 54 may be positioned upstream compressor 50 and may filter fresh air entering intake passage 56.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate bypassing it. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 48.

In the example of FIG. 1 a positive crankcase ventilation system (PCV) 16 is coupled to the engine intake so that gases in the crankcase may be vented in a controlled manner from the crankcase. The crankcase ventilation system 16 draws air into crankcase 28 via a breather or vent tube 74. Breather tube 74 may be coupled to fresh air intake 12 upstream of compressor 50. In some examples, breather tube may be coupled to intake 12 downstream of air filter 54. In other examples, breather tube may be coupled to air filter 54.

In the case where MAP (pressure at intake manifold 42) is lower than CIP (pressure at fresh air intake 12), the crankcase ventilation system vents air out of the crankcase and into intake manifold 42 via conduit 76 which, in some examples, may include a one-way PCV valve 78 to provide continual evacuation of gases from inside the crankcase 28 before connecting to the intake manifold 42. In the case where the pressure at crankcase 28 (crankcase pressure) is greater than the pressure sensed by pressure sensor 61, gases flow from the crankcase, through oil separator 81 and into fresh air intake 12 and eventually into the combustion chamber 34. This may be done in a stale air manner where no intake manifold air is let into the crankcase or in a positive crankcase ventilation manner where some manifold air is metered into the crankcase. However, in other examples conduit 76 may not include a one-way PCV valve.

Other systems may be designed for uni-directional operation where the crankcase gases only leave via a single path, out the vent tube 74 into the engine air inlet. These systems yield the benefit of having only one oil separator. As shown in the example of FIG. 1, the PCV conduit 76 may include a uni-directional oil separator 80 which filters oil from vapors exiting crankcase 28 before they re-enter the intake system 12. Another oil separator 81 may be disposed in breather tube 74 to filter oil from vapors exiting crankcase 28. In some examples, PCV conduit 76 may also include a vacuum sensor coupled to the PCV system. In some examples, gas flow in breather tube 74 may go in both directions, from crankcase 28 towards intake 12 and/or from intake 12 towards crankcase 28. Further, in some examples, during certain engine operating conditions, e.g., in turbocharger applications, gas may flow through conduit 76 in both directions, from crankcase 28 towards intake manifold 42 and/or from intake manifold 42 towards crankcase 28.

While the engine is running under light load and moderate throttle opening, the intake manifold air pressure may be less than crankcase air pressure. The lower pressure of the intake manifold draws fresh air towards it, pulling air from the crankcase vent tube 74 through the crankcase (where it dilutes and mixes with combustion gases), out of the crankcase via the PCV conduit through the PCV valve, and into the intake manifold. However, during other conditions, such as heavy load or under boosted conditions, the intake manifold air pressure may be greater than crankcase air pressure. As such, intake air may travel through the PCV conduit and into the crankcase.

Controller 48 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 48 may receive various signals from various sensors coupled to engine 10, engine coolant temperature (ECT) from temperature sensor 46; exhaust gas air/fuel ratio from exhaust gas sensor 64; and other PCV diagnostic sensors described below. Storage medium read-only memory 112 can be programmed with computer readable data representing instructions executable by processor 108 for performing the methods described below, as well as other variants that are anticipated but not specifically listed.

As remarked above, under certain conditions, crankcase ventilation systems may be monitored via a variety of sensors to identify breaches in the crankcase ventilation system. For example, a crankcase vent tube may become disconnected, an oil cap may be off or loose, a dipstick may be out, and/or other seals in the crankcase ventilation system may be compromised. Degradation of various components included in the crankcase may then occur.

Diagnostic blow by approaches may be used to monitor crankcase ventilation system integrity. For example, a valve 82 in the crankcase vent tube 74 may be opened so that pressure or vacuum changes may be sensed in the crankcase to determine if there is a breach in the ventilation system. Another approach may close the valve 82 in the breather tube 74 as well as isolation valves in PCV conduit 76 in order to isolate the crankcase from the atmosphere. For example, manually controlled versions of these isolation valves appear in the 1952 WILLYS® military vehicle with the designation "M38". One operator fording control resulted in closing both valves which resulted in crankcase pressurization, useful for preventing water ingress. During engine operation, as the engine heats up, or due to blow-by gases entering the crankcase, the pressure in the crankcase may increase. Valves 82 and 84 may be electronically actuated valves that are typically kept open to permit normal PCV operation, but commanded closed by the controller in order to detect breach.

Electronic control of these valves offer the opportunity to pressurize the crankcase by closing both valves and limiting the degree of pressurization by monitoring crankcase pressure during this configuration. Closing the vent valve 82 and opening valve 84 imposes a vacuum on the crankcase. In this way, via pressurization or imposing a vacuum in the crankcase, crankcase integrity can be assessed.

The pressure changes in the crankcase may be sensed by sensor 63. As depicted in FIG. 1, sensor 63 is immersed in the oil contained in the oil sump 32. Sensor 63 may be a pressure sensor which may be dually utilized to sense crankcase pressure under some conditions and the oil level of the oil sump 32 under other conditions. Alternatively or additionally, sensor 63 may be an oil level sensor (e.g., a float) which, when exposed to a reference pressure, may be used to determine crankcase pressure. Additional details regarding detecting crankcase pressure and oil level using a single sensor in the oil well will be provided below with regard to FIGS. 2 and 3.

Alternatively, an embodiment with no isolation valves may generate a vacuum in the crankcase due to the evacuation provided by the vacuum that forms in tube 74 during high engine air flow rates. In this embodiment, a sensed vacuum in the crankcase confirms crankcase integrity and oil level.

In other approaches, a plurality of absolute sensors, e.g., a barometric pressure sensor (BP) 51, a compressor inlet pressure sensor (CIP) 58, and/or a pressure sensor 61 in the crankcase vent tube 74, may be used in combination to monitor crankcase ventilation system integrity. For example, in some approaches, a barometric sensor 51, a compressor inlet sensor 58, and a pressure sensor 61 in the PCV breather tube 74 may all be used in to monitor crankcase ventilation system integrity.

Figure 2:
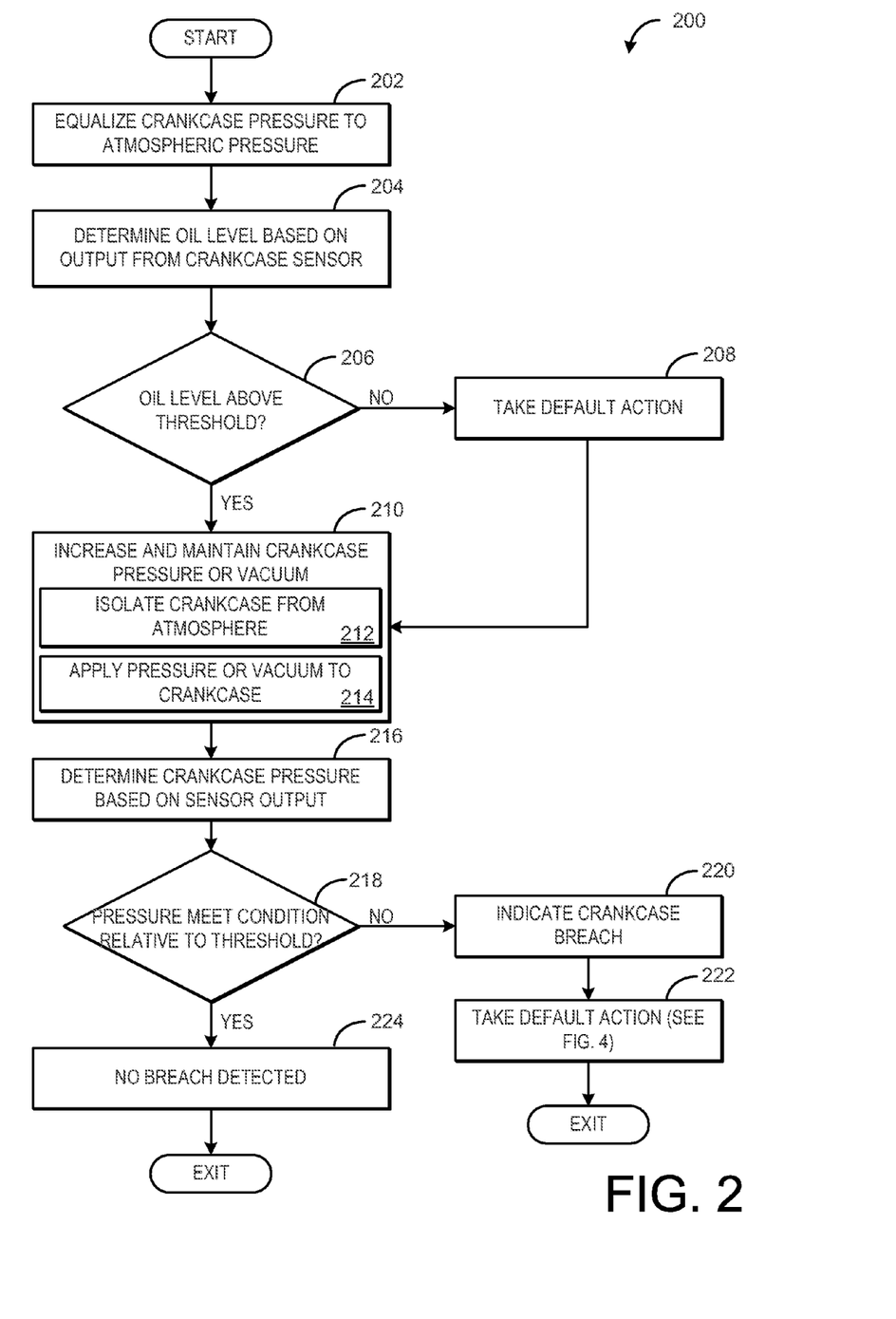
FIG. 2 shows an example method for determining oil level and crankcase pressure according to an embodiment of the present disclosure.
Figure 3:
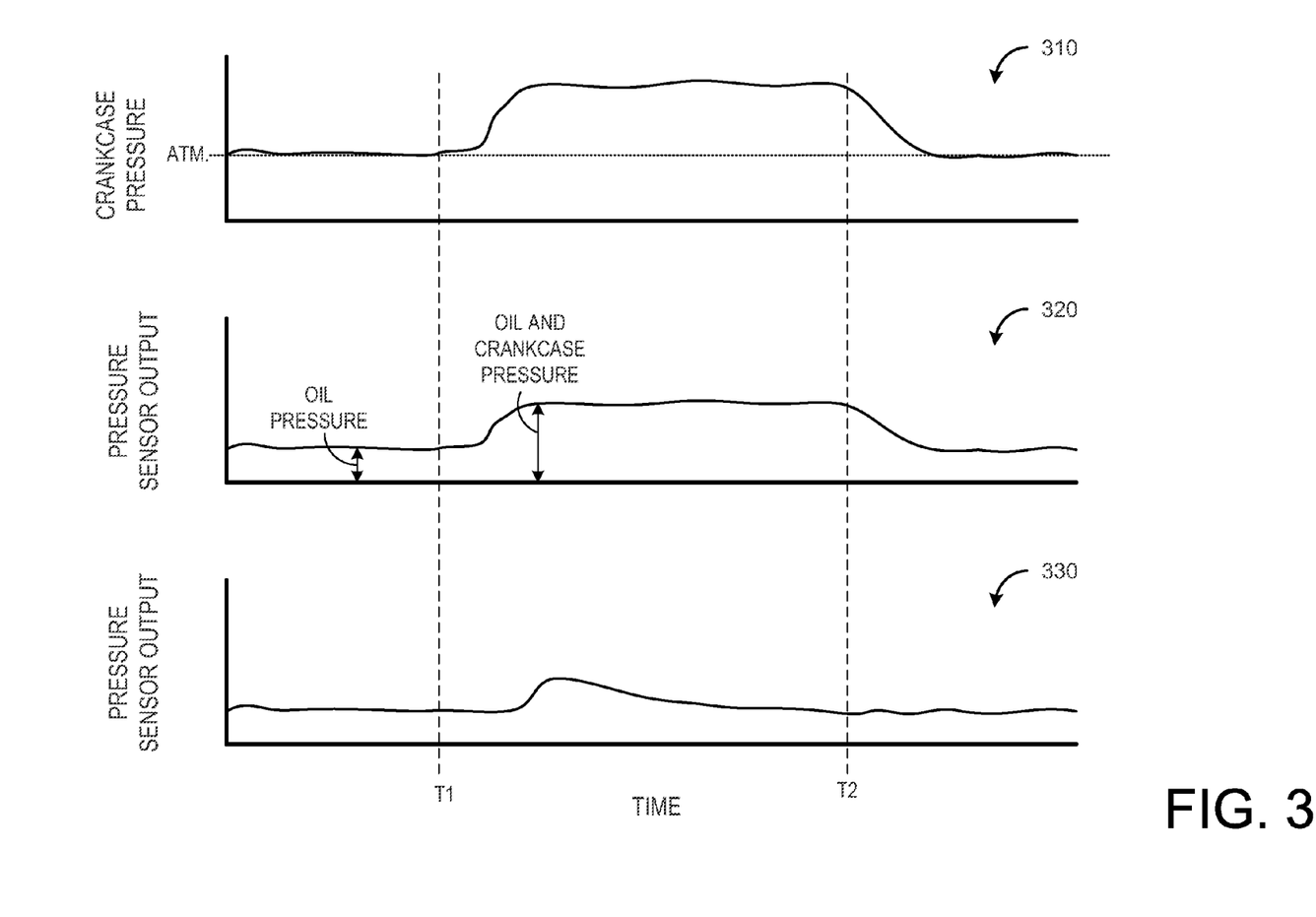
FIG. 3 shows example pressure sensor output with and without crankcase breach.

Turning to FIG. 2, a method 200 for detecting crankcase breach and determining oil level using a single sensor in the engine of a vehicle is depicted. Method 200 may be carried out according to instructions stored in the memory of controller 48 in response to feedback from sensor 63. Method 200 includes, at 202, equalizing crankcase pressure to atmospheric pressure. Equalizing crankcase pressure to atmospheric pressure may include opening one or more valves coupling the crankcase to the atmosphere. For example, a pressure reference tube may be present between the crankcase and an air conduit of the engine open to the atmosphere. The reference tube may substantially surround the sensor in the crankcase. When a valve in the reference tube is opened, the sensor may be exposed to atmospheric pressure. Alternatively or additionally, the crankcase may be equalized with atmospheric pressure during engine off conditions. In other examples, the pressure sensor may be exposed to a reference pressure other than atmospheric pressure, such as vacuum or multiple specific pressures.

When the crankcase is equalized with atmospheric pressure and/or when the sensor is exposed to atmospheric pressure, the oil level in the oil well may be determined from sensor output at 204. When the pressure of the gas (e.g., crankcase pressure) is at atmospheric pressure, the sensor senses only the pressure of the oil in which it is submerged. If the crankcase sensor is a pressure sensor, the sensor may output pressure in terms of voltage, which the controller may convert to oil depth (for example, mm of oil) based on the area of the oil well and the density of the engine oil. If the crankcase sensor is a level sensor that utilizes a float, for example, the sensor may mechanically or magnetically determine the depth of the oil in the oil well. The determined oil level may be stored in the memory of the controller to be used as a reference pressure or liquid level during a crankcase breach test, which will be described in more detail below.

At 206, it is determined if the oil level is above a threshold. The threshold may be a predetermined threshold below which engine damage may occur due to lack of oil. If the oil level is not above the threshold, method 200 proceeds to 208 to take default action. Taking default action may include notifying an operator of the vehicle by activating a malfunction indicator light. Additionally, the default action may include adjusting one or more engine operating parameters to reduce depletion of lubricant from the oil well, such as limiting engine speed. In some embodiments, after taking default action in response to the oil level being below the threshold, method 200 may end. However, in other embodiments, method 200 may proceed to 210 to carry out the breach detection test, in order to determine if crankcase breach is a potential cause for the oil level being below the threshold.

If the oil level is above the threshold at 206, or if default action has been taken at 208, method 200 proceeds to 210 to build and maintain pressure or vacuum in the crankcase. This may include isolating the crankcase from the atmosphere at 212. Isolating the crankcase from the atmosphere may include closing one or more valves coupling the crankcase to the atmosphere, such as valve 82 in the crankcase vent tube 74 and valve 84 in the PCV conduit 76. At 214, building and maintaining pressure or vacuum may include applying pressure or vacuum to the crankcase. Depending on the configuration of the engine and crankcase system, applying pressure or vacuum may occur in different ways. For example, if valves 82 and 84 are closed, during standard engine operation pressure may build in the crankcase due to blow-by gases and/or increasing engine heat. The maximum crankcase pressure would be limited by taking note of the resulting crankcase pressurization and opening the isolation valves above a threshold (and similarly for vacuum). In another example, instead of closing off the valves coupling the crankcase to the atmosphere, a PCV valve (such as valve 84 or 78) may be opened during idle in order to build vacuum in the crankcase. In a further example, a pressure or vacuum source may be switched to the crankcase, for example a vacuum pump in the engine may be coupled to the crankcase to create vacuum in the crankcase. The example mechanisms listed above for increasing pressure or vacuum in the crankcase are non-limiting examples, and virtually any mechanism to increase pressure or vacuum in the crankcase is within the scope of this disclosure.

Upon building and/or maintain pressure or vacuum, at 216, the crankcase pressure is determined based on the output from the crankcase sensor. If the crankcase sensor is a pressure sensor, the crankcase pressure may include the total pressure output by the sensor minus the pressure output by the sensor at atmospheric pressure. If the crankcase sensor is a level sensor, the pressure may be determined by measuring the oil level upon applying the pressure or vacuum and determining the difference between this oil level and the oil level determined at atmospheric pressure. The crankcase pressure may be determined over a given duration. For example, the crankcase pressure may be determined every second for a ten second duration, in order to monitor the change in pressure over time. If the crankcase is breached due to a small leak, the crankcase may be able to initially build vacuum or pressure, but may slowly lose the built pressure or vacuum over time. Thus, the crankcase pressure may be monitored for a given duration during the breach detection.

At 218, it is determined if the crankcase pressure meets a predetermined condition relative to a threshold. The condition relative to the threshold is dependent on how and to what extent the pressure or vacuum was built in the crankcase. For example, if vacuum is applied to the crankcase, breach may be indicated if the crankcase pressure is greater than the applied pressure (e.g., the crankcase does not reach a level of expected vacuum). If positive pressure is applied to the crankcase, breach may be indicated if the crankcase pressure is less than the applied pressure. Further, the condition relative to a threshold may include a magnitude of a slope of a plotted line of determined pressure over time. For example, the crankcase pressure may eventually reach the same amount as the applied pressure, but it may respond more quickly or more slowly to the applied pressure than expected.

If the crankcase pressure does not meet the condition relative to the threshold, method 200 proceeds to 220 to indicate crankcase breach. Upon indicating crankcase breach, default action may be taken at 222. Default action may include notifying an operator of the vehicle of the detected breach, setting a diagnostic code, and/or taking mitigating action based on the detected breach. Additional information regarding the default action will be presented below with respect to FIG. 4. Upon indicating breach and taking default action, method 200 exits.

Returning to 218, if the crankcase pressure does meet the condition relative to the threshold, that is, if the determined crankcase pressure responds to the applied vacuum or pressure as expected, method 200 proceeds to 224 to indicate no breach detected, and then method 200 exits.

In embodiments where the engine is configured without isolation valves and a pressure or vacuum naturally occur in the crankcase, the above procedure may be used, relying on naturally occurring pressure/vacuum rather than imposed pressure/vacuum.

FIG. 3 illustrates example pressure sensor outputs during a breach detection routine. Diagram 310 illustrates expected crankcase pressure on the y axis and time on the x axis. Diagrams 320 and 330 illustrate pressure sensor output on respective y axes and time on respective x axes. Diagram 320 illustrates pressure sensor output in an engine with a crankcase that is not breached, while diagram 330 illustrates pressure sensor output with a breached crankcase. Referring first to diagram 310, crankcase pressure is at atmospheric pressure prior to time T1. This may include an engine off period, or another suitable set of conditions wherein the crankcase pressure is equalized to atmospheric pressure. At time T1, the crankcase breach detection routine is initiated and the expected crankcase pressure increases above atmospheric pressure for a given duration. At time T2, the pressure that was applied to the crankcase is released and the crankcase pressure returns to atmospheric pressure.

Diagram 320 illustrates the pressure sensor output corresponding to the expected change in crankcase pressure. Prior to time T1, when crankcase pressure is at atmospheric pressure, the pressure sensor output corresponds to the pressure from the oil in the oil well in which the pressure sensor is submerged. This oil pressure may be converted to oil depth. Following the increase in expected pressure after time T1, the pressure output by the sensor increases corresponding to the increase in expected crankcase pressure. Thus, crankcase breach is not indicated. The crankcase pressure may be determined by the difference between the total sensed pressure after time T1 (the oil and crankcase pressure) and the oil pressure determined prior to time T1.

Diagram 330 illustrates the pressure sensor output with a breached crankcase. Similar to diagram 320 above, oil pressure may be determined when the crankcase pressure is at atmospheric pressure. Following time T1, the pressure output by the sensor increases, but the pressure is not maintained as expected. Rather, the pressure slowly returns to atmospheric pressure. Thus, crankcase breach is indicated.

Figure 4:
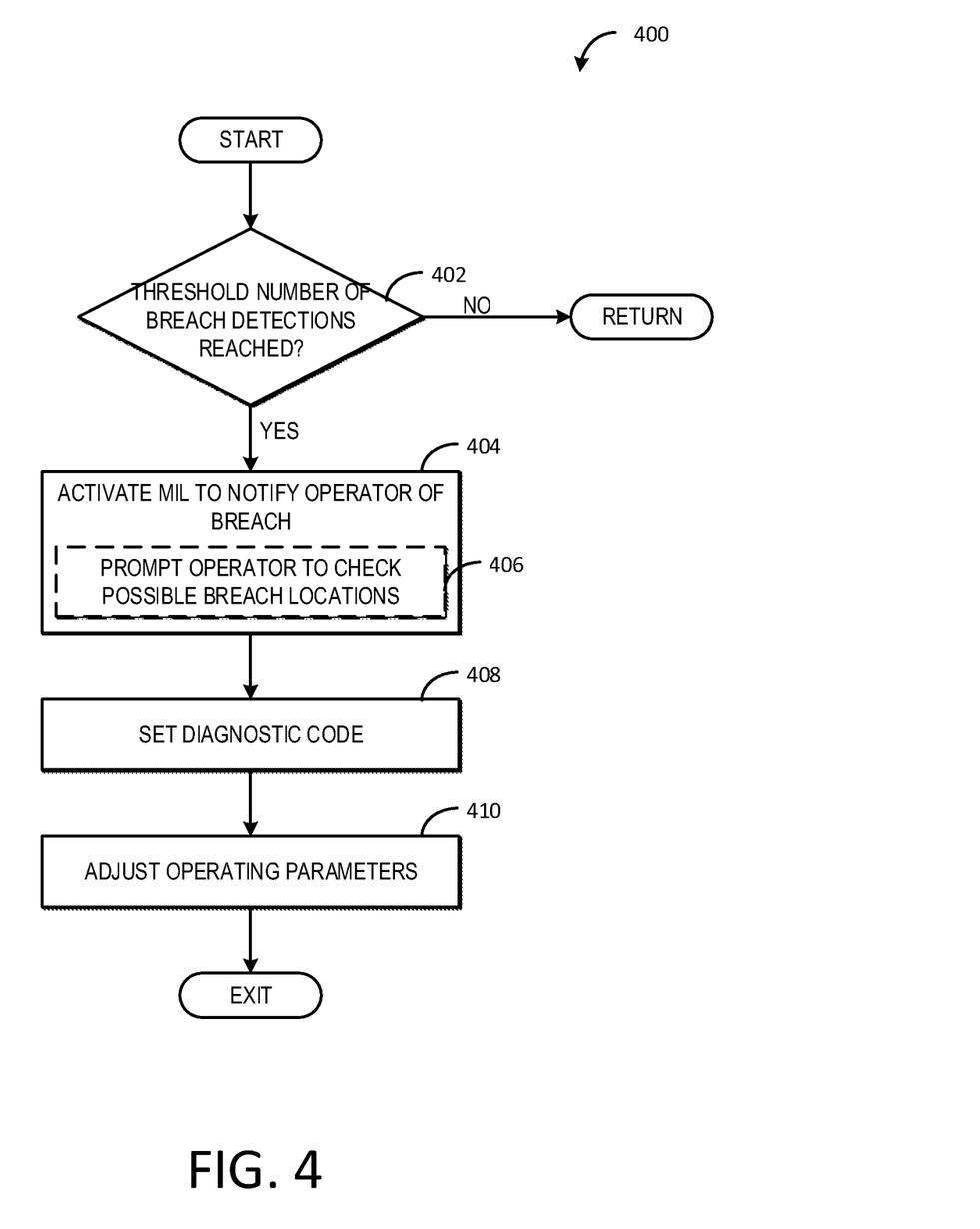
FIG. 4 shows an example method for notifying an operator of crankcase breach according to an embodiment of the present disclosure.

FIG. 4 illustrates a method 400 for notifying an operator in response to detected crankcase breach. Method 400 may be carried out by controller 48 in response to indicated crankcase breach. For example, method 400 may be carried out during the execution of method 200 described above with respect to FIG. 2.

At 402, method 400 includes determining if a threshold number of breach detections have been reached. The breach detection routine, such as method 200 of FIG. 2, may be rerun multiple times during a given engine operation duration. For example, the routine may be rerun continuously from key-on until key-off. When the routine indicates a crankcase breach, the controller may store each instance of breach detection for that engine operation duration, and execute a notification routine once a threshold number of detections have been reached. The threshold may be one breach detection in some embodiments. In other embodiments, to avoid false positive tests, the threshold may be multiple breach detections, such as two, five, ten, etc. If the threshold number of breach detections has not been reached, method 400 returns.

If the threshold number of breach detections has been reached, method 400 proceeds to 404 to display a message to a vehicle operator, such as activate a malfunction indicator light (MIL), to notify the operator of the vehicle of the detected crankcase breach. This may include, at 406, prompting the operator to check for possible breach locations. The breach may be caused by a loose or missing oil cap, for example, or by a misaligned/loose dipstick, which the operator of the vehicle may be able to adjust in order to fix the breach. The prompt may be included in the activation of the MIL, or be a separate prompt. Method 400 also includes, at 408, setting a diagnostic code.

At 410, one or more operating parameters may be adjusted in response to the detected breach. The detected breach may prompt the controller to take mitigating action to prevent additional engine damage during engine operation with the breached crankcase.

A mitigating action is initiated by the electronic control unit of the motor vehicle. The mitigating action may include acting to delay a depletion of lubricant from the crankcase if the crankcase is indicated breached. In particular, the mitigating action may include reducing an intake of air into the engine, limiting a speed or torque of the engine, limiting a fuel injection amount supplied to the engine, limiting a throttle opening, disabling the turbocharger, and/or various other actions intended to limit an aspiration of engine lubricant from breached crankcase. In some embodiments, the mitigating action taken may be one of a plurality of mitigating actions taken when a crankcase breach is detected. In one example, the plurality of mitigating actions may include adding lubricant to the crankcase—pumping lubricant from an auxiliary reservoir and into the crankcase, for example. Upon adjusting the one or more engine operating parameters, method 400 exits.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
indicating, via an electronic controller, both degradation of a crankcase ventilation system and a crankcase oil sump level based on a single common crankcase sensor, the crankcase oil sump level determined by the electronic controller in response to crankcase pressure being equalized with atmospheric pressure, where the single common crankcase sensor is a pressure sensor sensing pressure below an oil level of the crankcase oil sump.

2. The engine method of claim 1, wherein the indicating includes setting a diagnostic code and displaying a message to a vehicle operator.

3. The engine method of claim 1, wherein indicating both the degradation of the crankcase ventilation system and the crankcase oil sump level based on pressure sensor output further comprises:
determining the crankcase oil sump level in response to one or more valves coupling the crankcase to atmosphere being in an open position such that crankcase pressure is equalized with atmospheric pressure;
determining crankcase pressure based on the crankcase oil sump level and the pressure sensor output when crankcase pressure is not equalized with atmospheric pressure; and
adjusting engine operation in response to an indication of crankcase ventilation system degradation.

4. The engine method of claim 3, further comprising sealing the crankcase ventilation system and applying pressure to the crankcase ventilation system to set the crankcase pressure different than atmospheric pressure, where the indication is based on an output from the single common crankcase sensor at least while the crankcase pressure is set different than atmospheric pressure.

5. The engine method of claim 4, wherein degradation of the crankcase ventilation system is indicated if the determined crankcase pressure does not meet a predetermined condition relative to a threshold.

6. The engine method of claim 5, wherein the pressure applied to the crankcase ventilation system is greater than atmospheric pressure, and wherein the predetermined condition relative to the threshold comprises crankcase pressure greater than atmospheric pressure.

7. The engine method of claim 5, wherein the pressure applied to the crankcase ventilation system is less than atmospheric pressure, and wherein the predetermined condition relative to the threshold comprises crankcase pressure less than atmospheric pressure.

8. An engine system comprising:
a crankcase ventilation system including an oil well;
a pressure sensor positioned in the oil well and immersed in oil; and
a controller including instructions to:
during a first condition, determine oil well level based on output from the pressure sensor; and
during a second condition, indicate a breach in the crankcase ventilation system based on output from the pressure sensor.

9. The engine system of claim 8, wherein the controller includes instructions to indicate the breach in the crankcase ventilation system by determining a difference between the output from the pressure sensor during the second condition and the output from the pressure sensor during the first condition.

10. The engine system of claim 8, wherein the first condition comprises engine off operation and wherein the second condition comprises engine on operation and one or more valves coupling the crankcase to atmosphere being in a closed position.

11. The engine system of claim 8, wherein the controller includes instructions to convert the output from the pressure sensor to the oil well level based on density of the oil and area of the oil well.

12. The engine system of claim 8, wherein the breach is indicated if crankcase ventilation system pressure determined by the pressure sensor output is not maintained at an applied pressure.

* * * * *